Jan. 11, 1955
M. AUWÄRTER
2,699,093
SPECTACLES FOR NOCTURNAL ROAD USERS FOR THE
PROTECTION AGAINST THE DAZZLING EFFECT BY
THE HEAD LAMPS OF APPROACHING VEHICLES
Filed Nov. 18, 1950
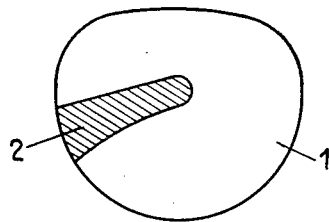
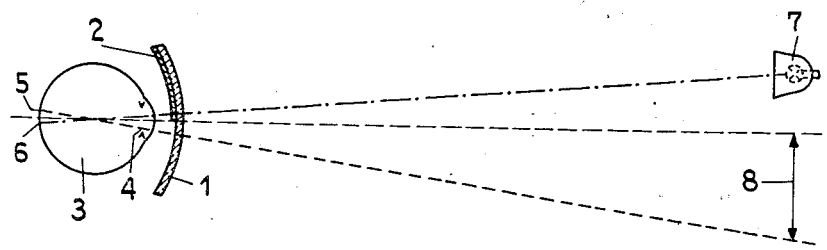
INVENTOR:
MAX AUWÄRTER United States Patent Office 2,699,093
Patented Jan. 11, 1955

2,699,093

SPECTACLES FOR NOCTURNAL ROAD USERS FOR THE PROTECTION AGAINST THE DAZZLING EFFECT BY THE HEAD LAMPS OF APPROACHING VEHICLES

Max Auwärter, Balzers, Liechtenstein, assignor to Alois Vogt, Vaduz, Liechtenstein Application November 18, 1950, Serial No. 196,488

Claims priority, application Switzerland November 18, 1949

3 Claims. (Cl. 88—41)

This invention relates to structures of spectacle glasses for the elimination of the dazzling effect by the head lamps of approaching vehicles. It is known to provide on spectacles dazzle protection flaps which cover the top half of the spectacle glasses or to provide colour glass wedges graduated from top to bottom of the glasses. Similar spectacles are known the glasses of which have near their center a small opaque or at least strongly light-absorbing blind spot behind which the pupil of the spectacle wearer can conceal itself on appearance of a dazzling light source. While the first mentioned measure offers an imperfect dazzle protection the last mentioned measure necessitates a certain rigid position of the head of the wearer of the spectacles by which the free sight on to the path of travel is taken from him. Polarisation filters, too, have not given a satisfactory solution to the problem of eliminating the dazzling effect of approaching vehicles.

The present invention aims at the elimination of the disadvantages mentioned and relates to spectacles for nocturnal road users for the protection against the dazzling effect by the head lamps of approaching vehicles by at least a partly light-absorbing coating in the shape of an acute-angled segment being arranged on each of the spectacle glasses, said segment extending and tapering from the edge of said spectacle glasses nearest to the opposite line of traffic on the road almost to the center of the respective spectacle glass and covering the pupil orifice of the eye of the wearer of said spectacles in the normal position of said eyes against the light rays of the head lamps of approaching and passing vehicles moving in the direction and/or opposite to the direction of travel of the wearer of said spectacles.

By way of example an embodiment of the object of the present invention is diagrammatically illustrated in the drawings accompanying and forming part of this specification, in which:

Fig. 1 shows a glass of protective spectacles with the segment-shaped coating viewed from the side of the eye of the spectacle wearer and adapted for right hand traffic on the road, and Fig. 2 a plan view of a horizontal section through an eye protected by means of the protective spectacles and through a head lamp of an approaching vehicle for the illustration of the mode of operation of said protective spectacles.

The pair of protective spectacles has two spectacle glasses 1, of which only one is illustrated because the other is of the same structure. The spectacle glass 1 is provided with a coating 2 of segment-like shape on the side of the glass adjacent the eye 3 of the spectacle wearer. Said segment extends from the edge of said glass nearest the opposite traffic line on the road, i. e. with the generally prevailing right-hand traffic rule, therefore from the left-hand edge of the glass at an acute angle almost to the center of said glass. The coating consists of a thin metallic layer applied by being vaporized on, said layer being partly opaque and having a great capacity of light absorption. With advantage this capacity of absorption of the coating is chosen in such a manner that for an eye looking therethrough the brightness of the head lamps of approaching vehicles is reduced approximately to that brightness which the part of the road illuminated by the head lamps of a vehicle used by the person has for the unprotected eye of said person.

The front and the rear surface of the spectacle glass is adapted for reduction of reflexion, e. g. by vaporizing on of a transparent covering layer also covering the metallic coating 2, the thickness of said covering layer being an odd multiple of ¼ of the wave length of the incident light of the frequency lying approximately in the middle of the sight range. The refractive index of the covering layer is the geometrical average of the refractive index of the adjacent air and the spectacle glass 1 at the point of the metallic coating 2, preferably, however, the geometrical average of the refractive indices of the air and the metallic layer.

The method of operation of the protective spectacles described is as follows:

While the spectacle wearer normally can view his traffic line 8 of the road unimpeded below the point of the segment-shaped coating 2, the orifice 4 of the pupil of the eye 3 adapted to the darkness can be brought behind the coating 2 by a slight inclination of the head on the appearance of an approaching vehicle for protecting said eye against the light rays of the head lamps 7 of said vehicle so that the light of said head lamps reaches the eye greatly damped and thus does no longer dazzle. From Fig. 2 it is evident that the light of the head lamps 7 is thrown through the coating 2 with decreased strength on to the point 6 of the eye whereas at the same time the light present on the own half 8 of the road, which light can originate from the head lamps of the vehicle used by the spectacle wearer or from stationary road lamps, falls undiminished onto the point 5 of the retina of the eye. On approach and passage of the vehicle the light of its head lamps 7 remains permanently behind the coating 2, since said layer extends to the edge of the spectacle glass and the spectacle wearer is therefore not forced to avert his eye from the normal position in order to avoid being dazzled. The own half of the road can therefore be at all times viewed without disturbance while the adaptation of the eye to the darkness is vouchsafed.

By the measure described for carrying out the reduction of reflexion the spectacle wearer is first of all also protected against dazzling by overtaking vehicles. From the light impinging on the spectacle glass from the rear a part is reflected at the boundary surface between the covering layer and the metallic layer and a further part at the boundary surface between the covering layer and the adjacent air, the two reflected components having, due to the described execution of the covering layer, approximately the same amplitudes and outside of the covering layer a phase difference of half a wave length so that due to interference they cancel each other out at a frequency of light lying within the sight range.

Secondly the reduction of reflexion prevents the occurrence of multiple reflexions between the front and the rear surface of the glass which otherwise could cause dazzling of the spectacle wearer on a roundabout way in spite of the metallic layer 2, the method of operation being analogous to that just described.

The described spectacles are in particular of great utility for vehicle drivers and they can contribute considerably to the raising of traffic safety during the night, as they prevent dazzling without impeding the capacity of observing one's own half of the road.

What I claim and wish to secure by Letters Patent is:

1. Spectacles for nocturnal road users to protect the eyes thereof against dazzling effect caused by light comprising at least one glass plate, a light-absorbing layer in the shape of an acute-angled segment applied to the surface of said one glass plate closest to the eye, said segment extending from the edge of said glass plate nearest to the line of oncoming traffic toward the center of said glass plate and shielding the orifice of the pupil of the eye of the spectacle wearer in normal position of said eye, and reflection reducing coating on said surface of said one glass plate and covering said layer to thereby reduce glare due to reflections from said glass plate, the index of refraction and thickness of said reflection reducing coating being such that at the boundary surfaces between air and said reflection reducing coating on the one hand and between said reflection reducing coating and said light-absorbing layer on the other hand the components of light rays penetrating said layer cancel each other out as far as possible for a light frequency lying about in the medium sight range.

2. Spectacles for nocturnal road users to protect their eyes against the dazzling effect caused by the head lamps of approaching vehicles; comprising a light-absorbing layer in the shape of an acute-angled segment applied to the surface of each glass of said spectacles closest to the eyes of the user, said segments extending from the edge of each glass nearest to the opposite road traffic line to almost the center of the respective glass and shielding the orifice of each pupil of the eye of the user in normal position of the eyes from the rays of the head lamps of approaching and passing vehicles, the surface of said glass facing the eye being provided with a reflection reducing coating, said layer consisting of a thin metallic layer vaporized on to each glass surface, the thickness and index of refraction of said reflection reducing coating being of such a value that at the boundary surfaces between the air and said coating on the one hand and between said reflection reducing coating and said metallic layer on the other hand the reflected components of the light rays penetrating said coating cancel each other out as far as possible for a light frequency lying approximately in the medium sight range.

3. Spectacles for nocturnal road users for the protection of their eyes against the dazzling effect caused by the head lamps of approaching vehicles having a light-absorbing metallic layer in the shape of an acute-angled segment applied to the rear surface only of each glass of said spectacles, said segments extending from the edge of said glass nearest to the opposite traffic line on the road to almost the center of the respective glass and shielding the orifice of the pupil of the eye of the spectacle wearer in the normal position of said eye from the rays of the head lamps of approaching and passing vehicles, the surface of said layer facing the eye being provided with reflection reducing coating, said coating extending further on the front and the rear surfaces of the spectacle glasses, said coating having a thickness and refractive index of such a value that at the boundary surfaces between the air and said coating on the one hand and between said reflection reducing coating and said metallic layer on the other hand the reflected components of the light rays penetrating said coating cancel each other out as far as possible for a light frequency lying approximately in the medium sight range.

References Cited in the file of this patent

UNITED STATES PATENTS

| | | |
|---|---|---|
| 1,938,085 | Page | Dec. 5, 1933 |
| 2,259,395 | Sachtleban | Oct. 14, 1941 |
| 2,409,356 | Hutchings | Oct. 15, 1946 |

FOREIGN PATENTS

| | | |
|---|---|---|
| 314,747 | Great Britain | July 4, 1929 |
| 747,714 | France | Apr. 4, 1933 |

OTHER REFERENCES

"The Optician," March 10, 1944, pages 87, 88.